(12) United States Patent
Horton

(10) Patent No.: US 6,364,050 B1
(45) Date of Patent: Apr. 2, 2002

(54) ELECTRICAL POWER ASSISTED STEERING ASSEMBLIES

(75) Inventor: Steven John Horton, West Midlands (GB)

(73) Assignee: TRW Lucas Varity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/483,137

(22) Filed: Jan. 13, 2000

(30) Foreign Application Priority Data

Jan. 15, 1999 (GB) .............................................. 9900774

(51) Int. Cl.$^7$ ................................................ B62D 5/04
(52) U.S. Cl. .......................... 180/446; 180/443; 701/41
(58) Field of Search ................................ 180/400, 417, 180/446, 444, 443; 701/41, 43; 250/231.17

(56) References Cited

U.S. PATENT DOCUMENTS

| | | | |
|---|---|---|---|
| 4,678,910 A | * | 7/1987 | Hara et al. ............. 250/231.17 |
| 4,803,629 A | | 2/1989 | Noto et al. |
| 5,465,210 A | | 11/1995 | Walenty |
| 5,742,918 A | * | 4/1998 | Ashrafi et al. ................ 701/70 |
| 5,857,160 A | * | 1/1999 | Dickinson et al. ............ 701/41 |
| 6,050,360 A | * | 4/2000 | Pattok et al. ................ 180/446 |
| 6,089,344 A | * | 7/2000 | Baughn et al. ............. 180/446 |
| 6,163,746 A | * | 12/2000 | Moerbe ....................... 701/41 |

* cited by examiner

Primary Examiner—Anne Marie Boehler
(74) Attorney, Agent, or Firm—Tarolli, Sundheim, Covell, Tummino & Szabo L.L.P.

(57) ABSTRACT

In an electric power assisted steering system, the output signal from a motor position sensor (9) comprising a number of Hall effect devices (A,B,C) or the like is combined with an index signal from a sensor (108) connected to the steering column shaft (1) or the rack (6) or a yaw sensor or other angular position dependent device to produce an accurate measure of steering angle relative to the straight ahead position. In a preferred arrangement, transitions in the Hall effect sensor output are used to drive a counter (106) which is reset whenever the index signal is produced to ensure it does not drift out over a period of time. Most conveniently, the index signal corresponds to the steering gear straight ahead position.

14 Claims, 4 Drawing Sheets

ELECTRICAL POWER ASSISTED STEERING ASSEMBLIES

This invention relates to improvements in electrical power assisted steering systems for vehicles of the kind in which an electric motor is operatively connected to a steering assembly via a gearbox to apply an assistance torque to the steering assembly, and in particular to apparatus for determining the angular position of a portion of a steering assembly.

It is well known to provide electric power assisted steering (EPAS) systems of the kind set forth. The steering assembly typically comprises a hand wheel connected to a steering shaft which is operatively connected to one or more roadwheels through a steering rack, although many different assemblies are in common use. Some EPAS systems use brushless motors in which the electric motor is provided with a motor position sensor to control the timing of switching, or communication of windings of the motor. The motor position sensor typically comprises an electromagnetic type switch or switches which changes state whenever a magnet provided on the rotor passes the sensor. Alternatively, a magnetised disc can be mounted on the rotor shaft and the sensor may detect movement of the magnets on the disc.

For example, in a 3-phase brushless permanent magnet motor, three Hall effect sensors can be located around the rotor in such a manner that a crude measurement of rotor electrical position can be obtained. However, this is unsuitable for use as an indication of the position of the steering shaft since the output will repeat within a single turn of the motor shaft and thus produce an ambiguous signal. The output also depends on the ratio of the gearbox.

In order to provide an accurate measurement of steering shaft position, it is known to provide an angular position sensor either mounted directly on the steering shaft or connected thereto via a gear drive. This produces an output which does not depend on the gearbox ratio as it reads directly from the steering shaft, but is expensive to produce.

In accordance with a first aspect, the invention provides an electric power assisted steering system of the kind in which an electric motor is operatively connected to a steering assembly through a gearbox to apply an assistance torque to the steering assembly, and comprising: a motor position sensing means adapted to produce an output indicative of the angular position of the motor rotor; and characterised by further comprising counting means adapted to count transitions in the output of the motor position sensing means to produce a count signal indicative of the angular position of the rotor relative to an arbitrary zero position; a steering position sensing means adapted to produce at least one position index signal indicative of a known angular position of a portion of the steering assembly and reset means adapted to reset the count signal produced by said counting means whenever said portion of said steering assembly is at said known angular position by monitoring said index signal.

The invention thus provides apparatus for monitoring the angular position of the steering assembly from the output of the motor position sensing means by counting transitions in the output of the motor position sensing means, and resetting the count whenever an index signal is produced from a sensor which indicates that the steering assembly position corresponds to the straight ahead position for the vehicle. The index signal may be provided from a steering column sensor, directly from a sensor adapted to monitor the position of a steering rack of the steering assembly, or from a yaw rate sensor adapted to produce an output indicative of the yaw rate of the vehicle.

Thus, a low cost index position sensor can be provided on the steering shaft simply to facilitate the reset timing.

By counting transitions we mean, for example, incrementing the count signal when the sensing means output changes state corresponding to rotation in one direction, and decrementing the count signal when a change of state occurs corresponding to rotation in the opposite direction. The value of the count signal is therefore indicative of the angular position of the steering shaft relative to the known angular position at which the reset occurs.

Preferably, the motor position sensing means may comprise one or more electromagnetic effect sensors adapted to detect the position of one or more rotor magnets or magnets fixed relative to the rotor of the motor. In an especially advantageous arrangement, the motor comprises a brushless permanent magnet motor, and the magnetic-effect sensors detect the position of the rotor magnets. Of course, other types of sensor could be used as an alternative.

The output signal from the motor position sensing means may, in addition to producing the count signal, advantageously be used to control the timing of, or commutation of, the motor rotor windings. The sensing means may comprise one or more Hall effect sensors. Preferably, it comprises three Hall effect sensors adapted to produce a three-bit output signal.

The system may include means adapted to "strobe" or periodically energise the motor position sensing means and/or the steering position sensing means and means adapted to sample the output of the sensing means when energised. The sensors may then be de-energised between samples. This minimises the average current drain compared to running the sensors continuously. It also enables the counter to track the steering shaft position even when the steering system is powered down by turning off the vehicle ignition without draining the vehicle battery excessively. A latch may be provided to latch the sampled value.

The steering position sensing means may be adapted to produce a single position index signal which may correspond to the straight ahead position of the steering shaft, or any other preferred angle of the steering. For instance, a pulse may be produced as the steering shaft rotates past a known position. It may comprise a single magnetic effect sensor adapted to detect the passing of a magnet on the shaft. Thus, the output of the steering position sensing means may have a first output value for all positions of the shaft other than at the index position when it take a second value. However, any other suitable output may be used as long as the index position can be identified by processing the output.

If one index signal is produced per revolution, the counter may be reset to zero (or another preferred value) once every time the steering shaft revolves. In this case, the maximum value held in the counter will depend on the number of transitions of the output of the motor sensing means for a single turn of the motor and upon the number of turns of the motor for a single turn of the steering shaft. This is obviously dependent on the gearbox ratio. Nevertheless, since the gearbox ratio remains constant, the value held in the counter will provide an accurate indication of the shaft position within a revolution of the steering shaft. Resetting helps prevent the total count drifting off over time. This may, for instance, occur if false "transitions" are recorded.

Preferably, however, the index signal is produced only when the steering is in the straight ahead position or some angle associated with the position, so that the value held in the counter may represent absolute steering angle relative to this straight ahead position.

The counting means may comprise a 16-bit counter although smaller or larger counters can be used. They may be binary counters.

The system may be battery operated, or at least partially battery operated. Battery status means may be provided which is adapted to detect when the battery is disconnected from the system. An error flag may be raised when the battery status means has detected removal or disconnection of the battery. If this flag is raised, the counter value may be treated as erroneous or unreliable on a subsequent power up, (i.e. reconnection of the battery). This is because the motor rotor may have rotated without the counter being updated is if was not powered up.

A processing means may be provided to correlate the value stored in the counter with a measure of the steering shaft position from a knowledge of the ratio of the gearbox.

There will now be described, by way of example only, one embodiment of the present invention with reference to the accompanying drawings of which:

Figure 4:
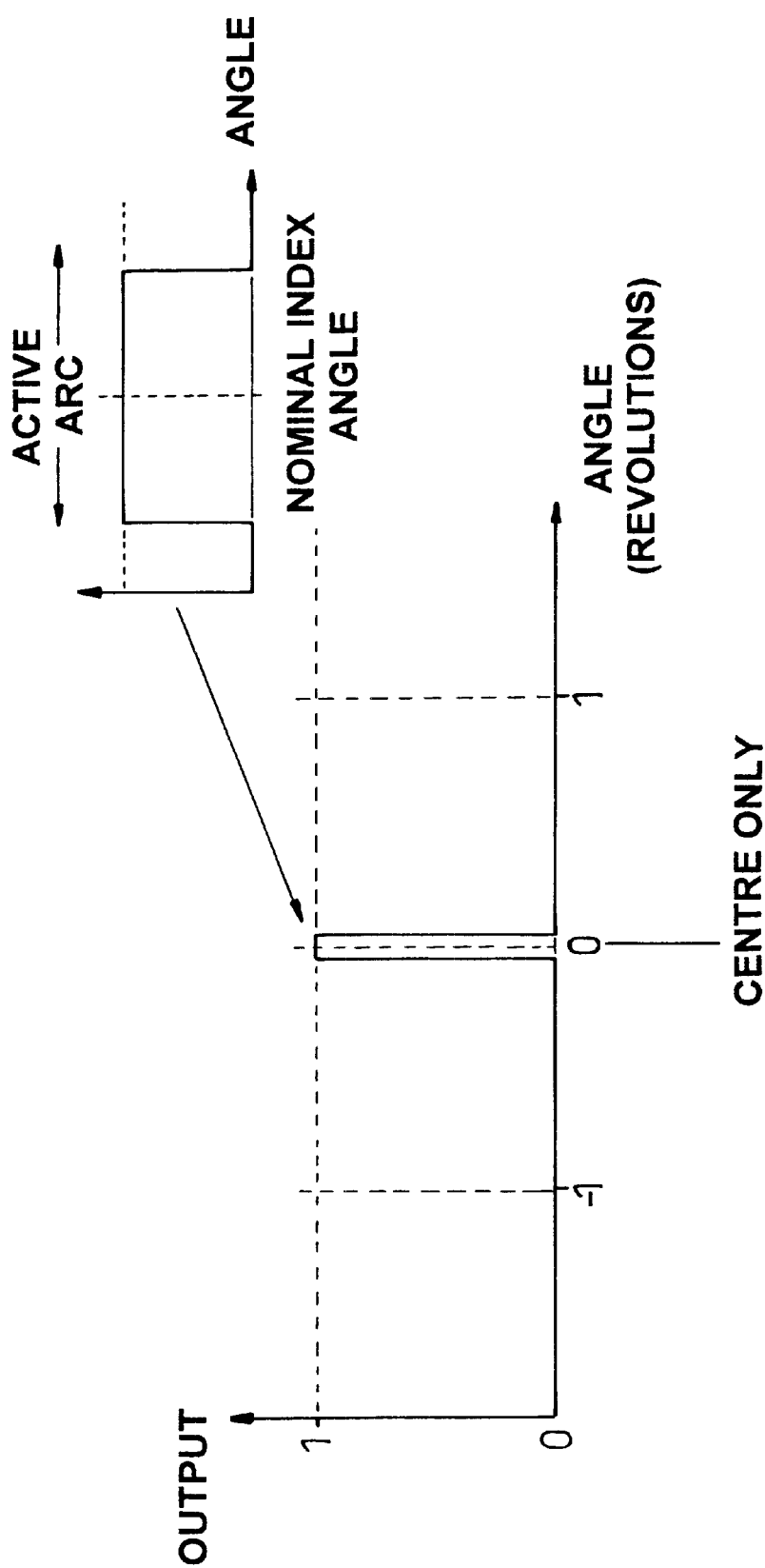
Figure 5:
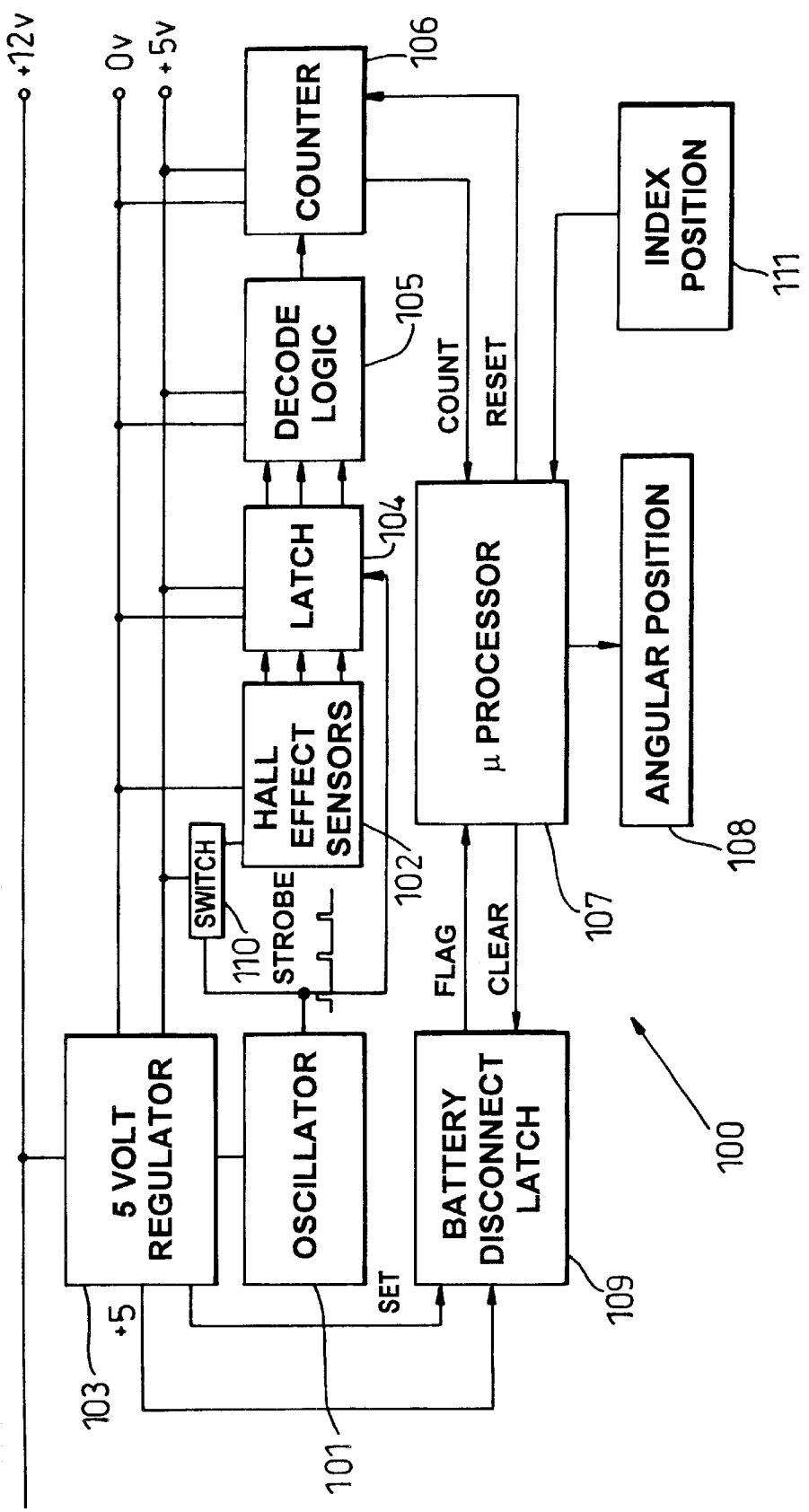

FIG. 4 illustrates an index signal produced from a combined torque position sensor on the steering shaft in addition to its torque output as the shaft passes the straight ahead position over +/− one revolution; and FIG. 5 is a block diagram illustrating means for processing the output from the Hall effect sensors and the index signal output from the torque sensor on the steering shaft to measure steering shaft position.

Figure 1:
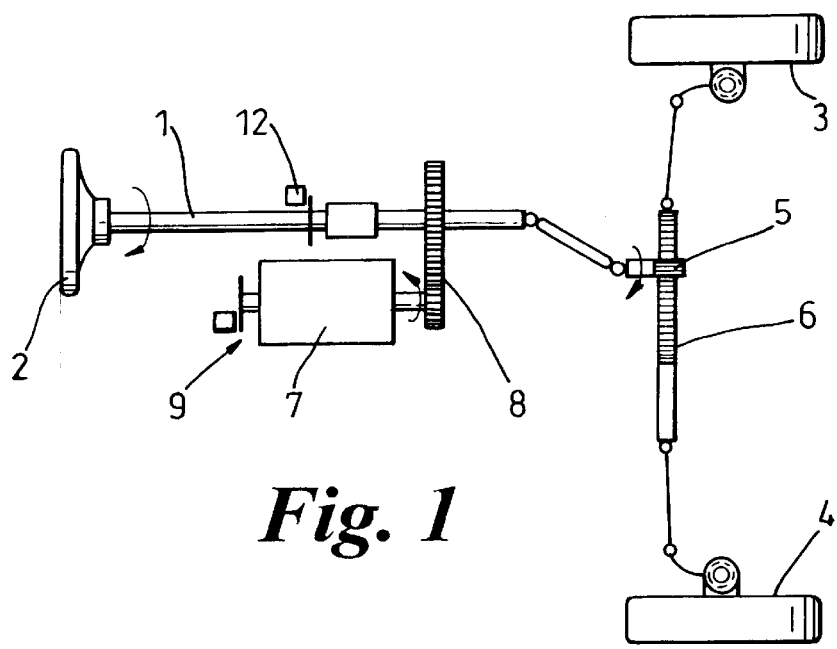
FIG. 1 is a schematic illustration of an electrical power assisted steering system in accordance with the invention.

The system shown in FIG. 1 comprises a steering shaft 1 operatively connected at one end to a steering wheel 2 and at its opposing end to a pair of road wheels 3, 4 through a rack and pinion gearbox 5, 6.

Figure 2:
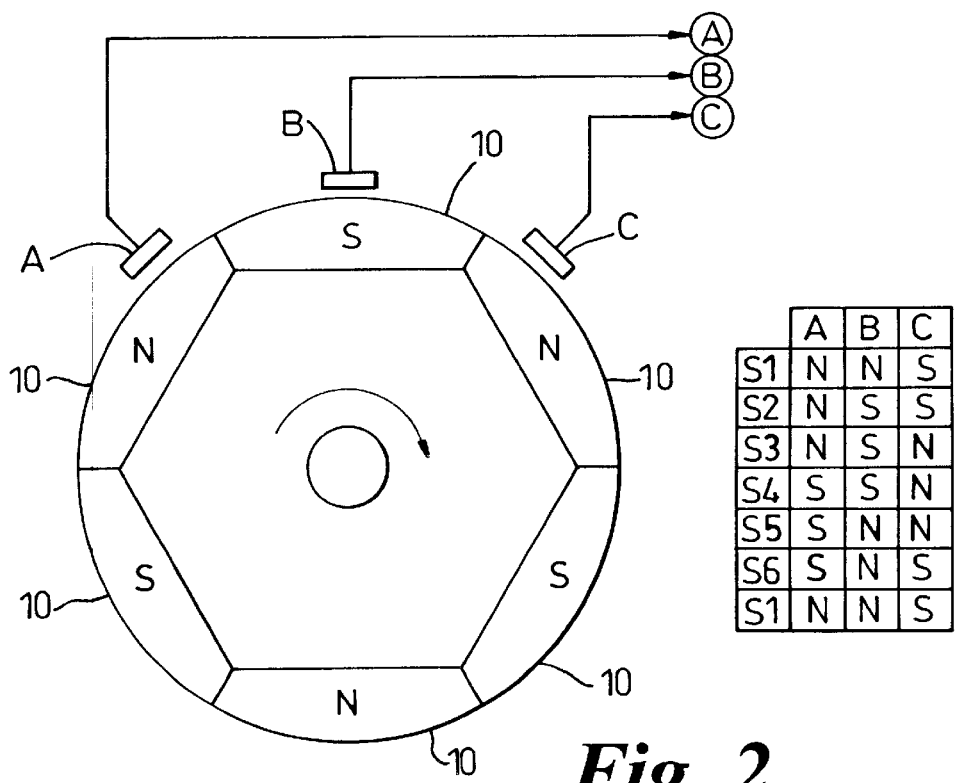
FIG. 2 shows the arrangement of 3 Hall effect sensors around a 6-pole rotor of a brushless electrical motor incorporated in the system of FIG. 1 and the sequence of alignment of the magnets relative to the sensors as the rotor rotates.

In order to provide torque assistance to the driver, the system further includes an electric motor 7 connected to the steering shaft 1 through a reduction gearbox 8 having a ratio of 16.5:1. The motor 7 comprises a 3-phase permanent magnet brushless motor and a sensing means 9 comprising three Hall effect sensors A, B, C is arranged around the motor 7 to detect the electrical angle of the rotor by measuring the position of the rotor magnets 10. This is shown in FIG. 2.

Figure 3A:
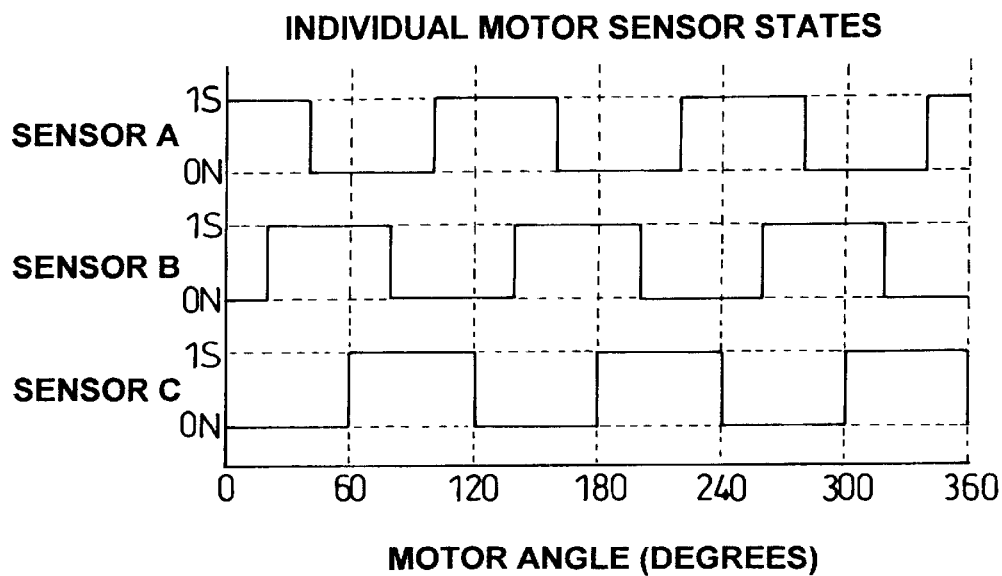
FIG. 3(a) illustrates a set of representative output signals from the Hall effect sensors which can be combined (b) to produce a single set of 6 three-bit values per 360 degrees electrical rotation of the rotor.
Figure 3B:
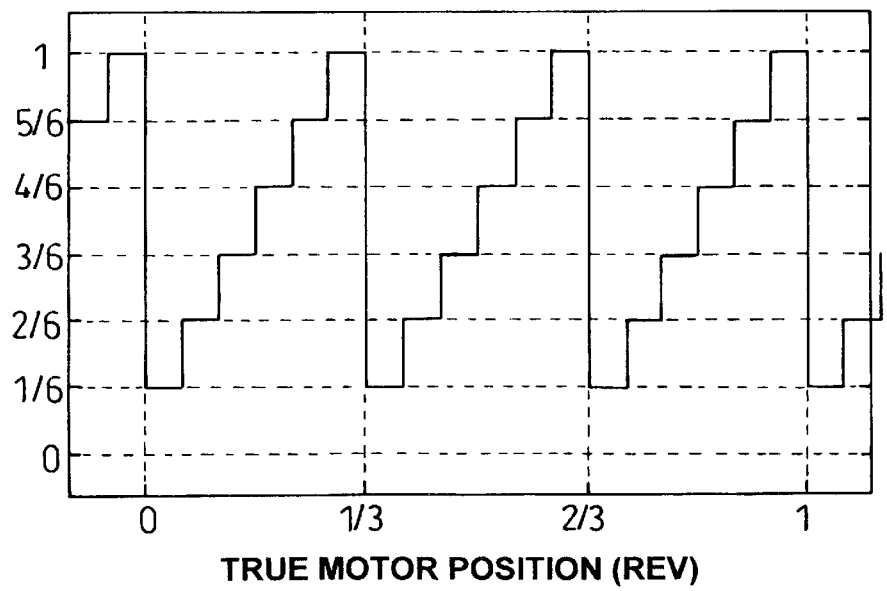

As shown in FIG. 3(a), each of the sensors A, B, C produces an output which is either zero or non-zero depending on whether a north pole of a rotor magnet or a south pole of a rotor magnet is within the detection range of a respective sensor. By suitable spacing of the sensors an incremental output having 6 3-bit values can be produced as shown in FIG. 3(b). Importantly, the sensor output is a measure of electrical angle and not absolute mechanical angle. For example, for a 3-phase motor with 6 rotor poles, the sensor output sequence will therefore repeat every 120 degrees mechanical. For the stated gearbox ratio this results in 297 Hall effect transitions per steering column revolution with a resolution at the steering column of just over 1.2 degrees per transition.

In order to provide accurate control of the motor 7, a combined torque/position sensor 12 is provided which measures the toque applied to the steering shaft by the driver acting on the steering wheel. The output from the torque sensor, which is indicative of torque, is used to produce a motor current demand value. This in turn is used to produce a motor current signal which controls the currents applied to the motor.

In addition to producing an output indicative of torque, the torque sensor produces an output signal indicative of the angle of the steering shaft. This is shown in FIG. 4. In the embodiment shown, this signal comprises a single index signal which is produced when the torque sensor is aligned corresponding to the straight ahead position of the steering shaft. In effect, the index comprises a narrow pulse which is produced when the steering shaft passes through the straight ahead position. This is independent of torque.

Alternatively a straight ahead steering index signal may be obtained for another sensor, for instance mounted directly on the steering rack 6, or from a yaw sensor which measures the rate at which the vehicle is turning.

Processing of the index signal and the output of the Hall effect sensors enables a measurement of steering shaft angular position to be produced which has a considerably higher resolution than the single index signal. The processing is achieved electrically.

The output from all three Hall effect sensors is passed to a first processing stage. Whenever a Hall effect sensor changes state, the first processing stage produces either a count-up or a count-down signal.

The count-up signal is produced whenever the transition in Hall-effect state is indicative of movement of the motor rotor in a first direction. The count down signal is produced whenever the transition is indicative of movement of the motor rotor in a second, opposite direction. For instance, the first direction may correspond to transitions of the Hall sensor output from $S_1$–$S_2$, $S_2$–$S_3$, $S_3$–$S_4$, $S_4$–$S_5$, $S_5$–$S_6$, S6–S1. The second direction may correspond to transitions S1–S6, S6-S5, S5-S4. . . $S_2$–$S_1$ etc.

The output of the first processing stage is passed to a 16-bit counter. If a count-up signal is received, the count value held in the counter is incremented by 1. If a count-down signal is received, the value stored in the counter is decremented by 1.

The value in the counter is initially set to zero when the steering shaft is in the straight ahead position. This corresponds to the index signal from the torque (or other) sensor. For continuous turning of the wheel in one direction, the value held in the counter will increase in steps until such time as the steering shaft returns in the opposite direction to the straight ahead position. The counter counts up in one steering direction and down in the other. At the straight ahead point, the counter is reset. Thus, any errors in the count are continuously reset as the steering wheel is moved through the straight ahead position.

A problem may arise if the counter is not updated when the steering system is powered down. For instance, the electrical power assisted steering system may be placed in an inoperative state when the vehicle ignition is switched off. This may be intentional to prevent battery drain due to operation of the motor when the engine is not running.

In such a case, however, it may still be possible to turn the steering wheel. The value held in the counter would not be updated (as the power is switched off) and on restarting would provide an erroneous position signal.

To overcome this problem, the Hall effect sensors are strobed by repeatedly switching them on for a short period spaced by periods in which they are switched off. This allows a position reading to be made and the counter updated. The sensors are thus switched off between readings. To ensure no transitions are missed, the frequency of sampling the sensor output should exceed at least twice the maximum rate of change of the sensor output. A limit is imposed by the physical limitation of the maximum speed of the motor.

A schematic of a system 100 for operation the sensors and performing the processing is shown in FIG. 5. It comprises of an oscillator 101, the output of which is applied to 110 to turn on the Hall effect devices 102 for $\frac{1}{16}^{th}$ of a duty cycle. However, other ratios are possible. The oscillator is powered from a twelve volt vehicle battery through a 5 volt regulator 103. This also powers the Hall effect sensors through the switch 110, a latch 104 which samples and holds the output of the sensors, decode logic 105 and a transition counter 106 which processes the output of the Hall effect sensors. The output of the counter is passed to a microprocessor 107 which converts the count into an angle 108.

As an additional safety feature, a battery disconnect latch 109 is provided which detects when the battery has been disconnected or drained when the system is powered down. The latch 109 raises an error flag is power is removed. On start-up, the flag is interrogated by the microprocessor 107. If it is raised, the value held in the counter can be treated as erroneous. An alternative means can then be used to determine the straight ahead position where upon the counter can be reset and the error flag cleared.

The resolution of the system is dependent upon the number of Hall effect sensor transitions for each motor mechanical revolution and upon the gearbox ratio. However, at the instant of a Hall effect sensor transition, the accuracy of the position measurement will be relatively high using such a system without the need for a costly absolute position sensor on the steering shaft.

An additional input to the microprocessor 107, comprises an index position signal 111. This signal occurs whether the output of the column position sensor produces a pulsed index. As this occurs it is known that the steering column is in the straight ahead position and can be used as a trigger to reset the counter.

What is claimed is:

1. An electric power assisted system comprising a steering assembly, an electric motor which includes a rotor, and a gearbox, said electric motor being operatively connected to said steering assembly through said gearbox to apply an assistance torque to said steering assembly, and further comprising a motor position sensor adapted to produce an output indicative of angular position of said motor rotor, said output undergoing a plurality of transitions as said rotor rotates, a counter adapted to generate a count signal indicative of said transitions in said output of said motor position sensor whereby said count signal is indicative of angular position of said rotor relative to an arbitrary zero position, a steering position sensor having an output which comprises at least one position index signal indicative of a known angular position of a portion of said steering assembly, and a reset means adapted to reset the output of said counter whenever said portion of said steering assembly is at said known angular position by monitoring said index signal.

2. An electric power assisted steering system according to claim 1 wherein said steering position sensor comprises a steering column sensor which is adapted to produce said index signal by directly monitoring the position of a portion of said steering assembly.

3. An electric power assisted steering system according to claim 1 wherein said motor position sensor comprises one or more electromagnetic effect sensors adapted to detect the position of one or more rotor magnets or magnets fixed relative to said rotor of said motor.

4. An electric power assisted steering system according to claim 3, wherein said motor comprises a brushless permanent magnet motor and said magnetic-effect sensors detect the position of said rotor magnets (10).

5. An electric power assisted steering system according to claim 3 wherein said motor position sensor comprises three Hall effect sensors adapted to produce a three-bit output signal.

6. An electric power assisted steering system according to claim 1 whereby energising means are provided which are adapted to periodically energise the motor position sensor and/or said steering position sensor and sampling means for sampling said output of said sensors when energised so as to minimise current drain between measurements.

7. An electric power assisted steering system according to claim 1 wherein said steering position sensor is adapted to produce a single position index signal which corresponds to the straight ahead position of said steering assembly.

8. An electric power assisted steering system according to claim 7 wherein said motor signal comprises a pulse which is produced as said portion of said steering assembly rotates past a known position.

9. An electric power assisted steering system according to claim 1 wherein said steering position sensor comprises a single magnetic effect sensor adapted to detect the passing of a magnet on said portion of said steering assembly.

10. An electric power assisted steering system according to claim 1 wherein said counting means comprises a 16-bit counter.

11. An electric power assisted steering system according to claim 1 which is battery operated, or at least partially battery operated.

12. An electric power assisted steering system according to claim 11 in which a battery status monitor is provided which is adapted to detect when said battery is disconnected from said system.

13. An electric power assisted steering system according to claim 1 wherein a processor is provided which is adapted to correlate the output of the counter with a measure of the position of said portion of said steering assembly dependent upon a ratio of said gearbox.

14. An electric power assisted steering system according to claim 1 whereby said portion of said steering assembly comprises a steering shaft.

* * * * *